United States Patent [19]

Gebhardt et al.

[11] 4,106,668

[45] Aug. 15, 1978

[54] DEVICE FOR DISPLAYING AND STORING ARTICLES

[75] Inventors: Roland Gebhardt; Robert P. Gersin, both of New York, N.Y.

[73] Assignee: Kayser-Roth Corporation, New York, N.Y.

[21] Appl. No.: 768,259

[22] Filed: Feb. 14, 1977

[51] Int. Cl.² ............................................. B65G 59/00
[52] U.S. Cl. ................................. 221/131; 221/155; 221/279; 221/310
[58] Field of Search ................................ 221/226–232, 221/131, 279, 280, 307, 309, 310, 155; 312/61, 71; 220/93; 271/30 A, 129

[56] References Cited

U.S. PATENT DOCUMENTS

| | | | |
|---|---|---|---|
| 1,207,092 | 12/1916 | Sullivan | 221/279 |
| 2,298,884 | 10/1942 | Hope | 221/279 |
| 2,534,169 | 12/1950 | Hope | 221/279 |
| 3,214,227 | 10/1965 | Filipowicz | 312/71 |
| 3,224,822 | 12/1965 | Kirby | 312/71 |
| 3,242,930 | 3/1966 | Wilnet | 221/131 |
| 3,435,988 | 4/1969 | Jonas et al. | 221/310 |

*Primary Examiner*—Stanley H. Tollberg
*Assistant Examiner*—H. Grant Skaggs
*Attorney, Agent, or Firm*—Blum, Moscovitz, Friedman & Kaplan

[57] ABSTRACT

A device for displaying and storing articles includes a wall structure which defines at least one chamber which is open at one end and which is adapted to receive in its interior a plurality of articles arranged one behind the other with one of the articles situated nearer to the open end of the chamber than the other articles. A pusher engages in the chamber that one of the articles which is most distant from the open end of the chamber, and a spring structure cooperates with the pusher to urge the latter toward the open end of the chamber so that the pusher tends to advance the articles out of the chamber through the open end thereof. A retainer structure is situated at the open end of the chamber for retaining the articles therein in such a way that the particular article which is nearest to the open end of the chamber can be manually removed therefrom, whereupon all of the articles are advanced by the pusher until the next article occupies the space previously occupied by the withdrawn article.

9 Claims, 4 Drawing Figures

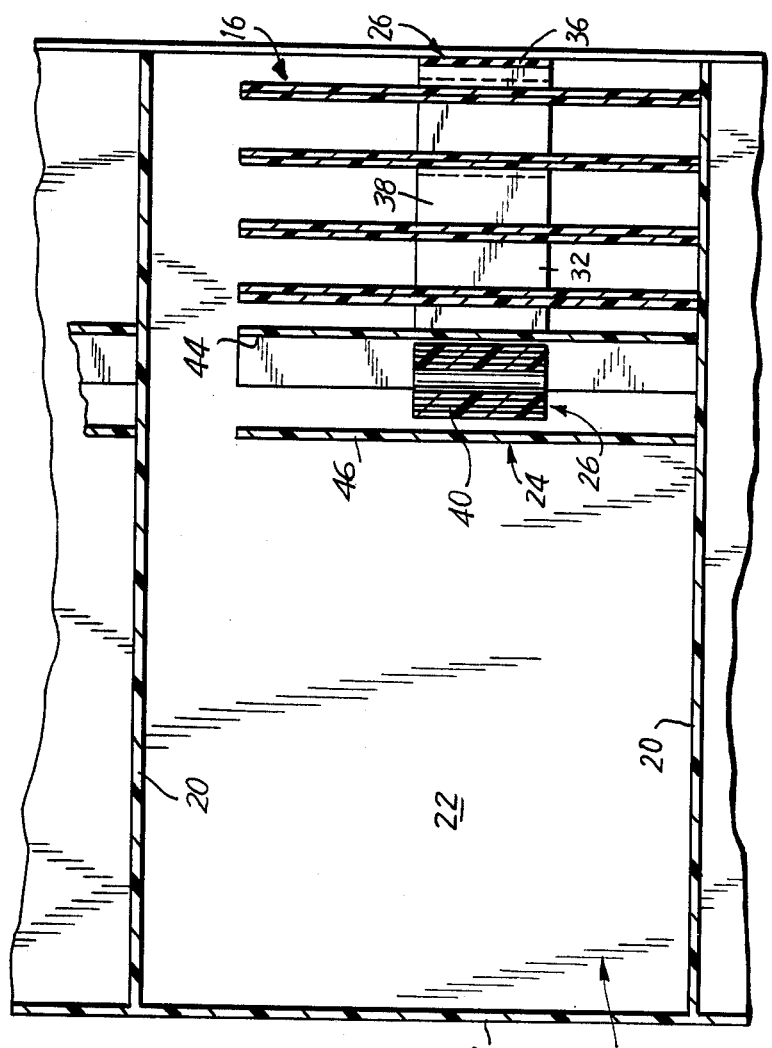
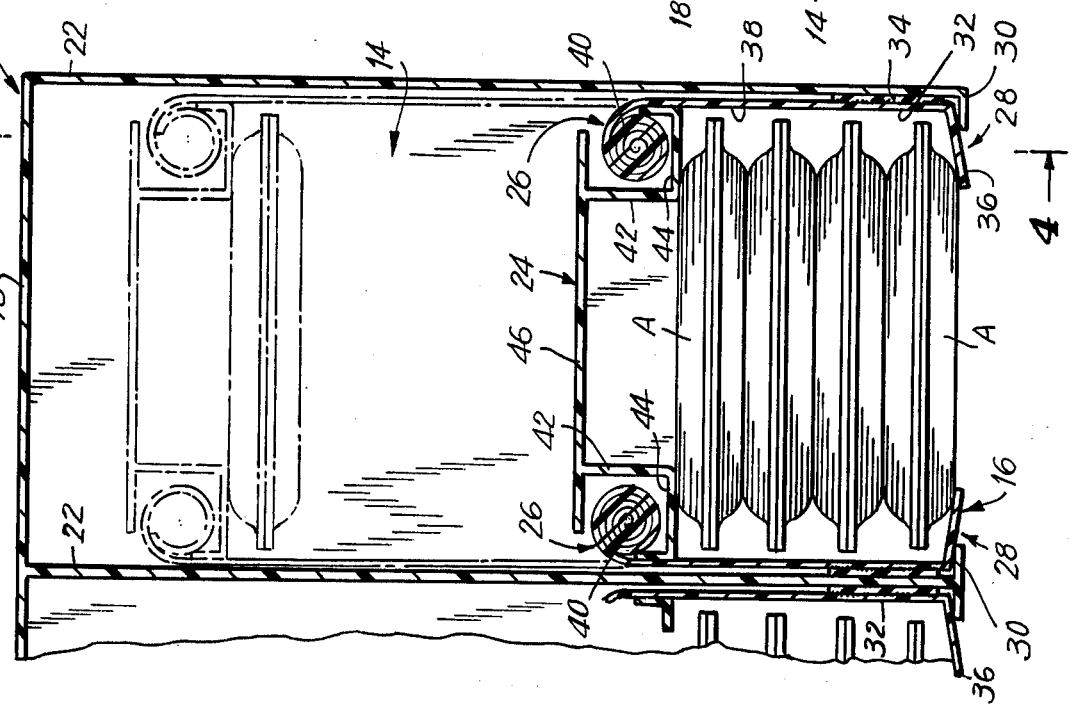

DEVICE FOR DISPLAYING AND STORING ARTICLES

BACKGROUND OF THE INVENTION

The present invention relates to devices such as display racks and the like which are adapted to store a plurality of articles as well as to display the articles.

Thus, the invention relates to a device which is designed to store and display a relatively large number of articles in such a way that while the articles are readily available to be taken from the display device at the same time they are maintained on display.

While devices of the above type are generally known, the known devices on the one hand do not afford the best possible display arrangement of the articles and on the other hand do not store the articles in such a way that they are at all times conveniently available to be withdrawn from the display device.

SUMMARY OF THE INVENTION

It is accordingly a primary object of the present invention to provide a device of the above general type which is superior to previously known devices of this type and which solves the above problems.

Thus, it is an object of the present invention to provide a display device which on the one hand is capable of effectively storing a relatively large number of articles and which on the other hand is capable of operating automatically so as to maintain the articles at all times in an arrangement according to which they are effectively displayed.

It is furthermore an object of the present invention to provide a device of the above type which is relatively simple in its construction and at the same time highly reliable in its operation, with the device of the invention being capable of manufacture at a relatively low cost while at the same time being of a light weight and extremely convenient to set up for the purposes of storing and displaying articles.

According to the invention, the device includes a wall means which defines at least one chamber which is provided with at least one open end, this chamber being adapted to receive a plurality of articles situated one behind the other with one of the articles situated nearer to the open end of the chamber than the other articles. The pusher means is situated in the chamber engaging that one of the articles which is most distant from the open end of the chamber for pushing the articles toward the open end of the chamber, and a spring means cooperates with the pusher means to urge the latter toward the open end of the chamber. A retainer means is situated at the region of the open end of the chamber for retaining in the chamber all of the articles with one of the articles nearer to the open end of the chamber than the other articles, this retainer means operating in such a way that that article which is nearest the open end of the chamber can be manually removed, whereupon the spring means and pusher means cooperate to advance the remaining articles toward the open end of the chamber so that the article next to the withdrawn article moves into the position previously occupied by the withdrawn article. Preferably the wall means defines a plurality of the above chambers each of which is provided with its own pusher means and spring means as well as with its own retainer means, and all of the chambers are arranged in a plurality of rows which are situated one next to the other.

BRIEF DESCRIPTION OF DRAWINGS

The invention is illustrated by way of example in the accompanying drawings which form part of this application and in which:

FIG. 3 is a fragmentary sectional plan view of part of the structure of FIG. 1 taken along 3—3 of FIG. 1 in the direction of the arrows and showing the structure also at a scale which is greatly enlarged as compared to FIG. 1;

FIG. 4 is a fragmentary sectional elevation of the structure of FIG. 3 taken along line 4—4 of FIG. 3 in the direction of the arrows.

DESCRIPTION OF A PREFERRED EMBODIMENT

Figure 2:
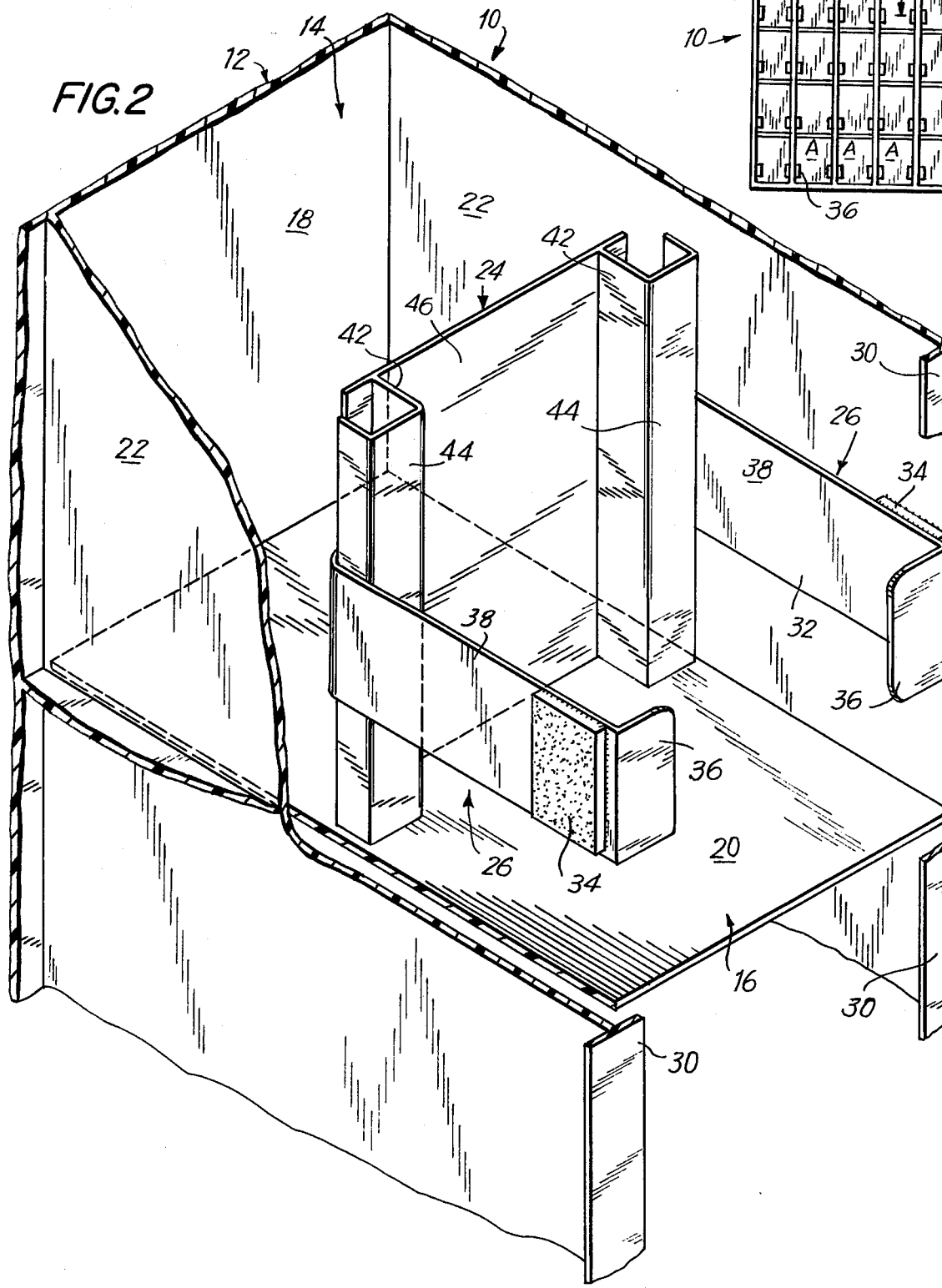
FIG. 2 is a fragmentary perspective partly sectional view of the details of part of the structure of FIG. 1 shown at a scale which is greatly enlarged as compared to FIG. 1.

Referring first to FIG. 2, there is shown therein part of a device 10 according to the invention for displaying and storing articles. This device 10 includes a wall means 12 which defines a plurality of chambers 14 the interior of one of which is indicated in FIG. 2. The illustrated chamber 14, defined by the wall means 12, includes a front open end 16, the chamber 14 in the illustrated example being closed at its rear end by a part 18 of a rear vertical wall which extends across all of the chambers 14. Each chamber 14, in addition to being defined in part by the rear wall 18 is defined also by upper and lower walls 20, and only the lower wall 20 of the chamber 14 of FIG. 2 is illustrated. Each chamber 14 is also defined by a pair of upright side walls 22, one of which is shown fragmentarily in FIG. 2 while the other is shown substantially in its entirety.

Within each chamber 14 is a pusher means 24 which serves to push, as shown most clearly in FIG. 3, a plurality of articles A toward the open end 16 of the chamber 14. Thus, as is shown in FIG. 3, the articles A are arranged one behind the other in the chamber 14 with one of the articles situated closer to the open end 16 than the other articles. That one of the articles A which is most distant from the open end 16 is engaged by the pusher means 24. A spring means 26 is operatively connected with the pusher means 24 to urge the latter toward the open end 16 of the chamber 14, so that the pusher means 24 and spring means 26 cooperate to urge the series of articles A out of the chamber 14 through the open end 16 thereof. However, the articles are prevented from being displaced out of the chamber by a retainer means 28 which retains the series of articles A in each chamber 14 in such a way that that one of the articles which is nearest to the open end 16 of each chamber 14 can be manually removed therefrom, whereupon the pusher means 24 is displaced by the spring means 26 nearer to the open end 16 of the chamber 14 to advance all of the articles toward the open end of the chamber until the article next to the removed article occupies the position previously occupied by the removed article.

The wall means 12 includes for each chamber 14 a pair of opposed walls 22, as set forth above. These opposed walls 22 terminate in ends at the open end 16, and at these ends the walls 22 have fixed integrally therewith inwardly directed flanges 30 which form part of the retainer means 28. In addition to the flanges 30, the retainer means 28 includes at each chamber 14 a pair of springy members 32 which are fixed to the opposed walls 22. For this purpose relatively small adhesive members 34 are fixed with the springy members 32 and also are fixed with the inner surfaces of the walls 22 where these inner surfaces are directed toward each other adjacent the open end 16 of each chamber, so that in this way the springy members 32 are fixed to the opposed walls 22. Each of the springy members 32 have free end portions 36 which are springy and yieldable and which are situated just behind the flanges 30 while extending inwardly beyond these flanges for directly engages the article A which is nearest to the open end 16 of each chamber 14. The springy members 32 may be made of a transparent plastic such as Mylar and it will be seen that the flanges 30 reinforce the free end portions 36 of the retainer means 28. The articles A may be any articles such as relatively soft packages of stockings, pantyhose, or the like, so that with the arrangement illustrated the operator can easily grasp the article A which is visible and accessible at the opening 16 to remove the latter while flexing the springy portions 36 as required to remove such an article.

As is apparent from the drawings, the flanges 30 are relatively narrow so that they do not in any appreciable way obstruct the complete visibility of the front of the article A which is nearest to the open end 16 of each chamber 14. In addition it will be seen that the free end portions 36 of the springy members 32 not only are transparent but in addition have a length which is only a small fraction of the length of each flange 30 of each chamber 14, with these free end portions 36 extending inwardly from the flanges 30, between the top and bottom ends thereof, by a distance which is only sufficient to securely retain the article A nearest the open end 16 of each chamber 14 within the chamber while overlapping the front surface of this article A to only a small extent so that while the article A nearest the open end 16 of each chamber is reliably maintained therein at the same time substantially the entire front surface of this article A is visible to provide an excellent display thereof.

The spring means 26 includes a pair of elongated tapes 38 made of a plastic material such as Mylar and tending to coil upon themselves so that these springy tapes 38 form automatically the coils 40 indicated in FIGS. 3 and 4. It will be noted that the springy tapes 38 which form the spring means 26 are in fact integral extensions of the springy members 32, and the series of articles A while resting on the lower wall 20 of each chamber 14, at the lower edges of the articles A, at the same time are situated between the pair of springy tapes 38 where they extend from the springy members 32 up to the pusher means 24.

The pusher means 24 has a pair of opposed channels 42 which respectively receive the coils 40 in the manner shown most clearly in FIG. 3. Thus, the channels 42 respectively have transverse channel walls 44 which engage the article A which is most distant from the opening 16 at opposed side regions of this innermost article A. The pusher means 24 has itself a transverse wall 46 situated more distant from the opening 16 than the transverse channel walls 44, these channels 42 being fixed at their inner side walls to the transverse pusher wall 46 in the manner shown most clearly in FIG. 3. The outer side walls of the channels 42 and the outer side edges of the transverse wall 46 are spaced from each other to afford openings through which the springy tapes 36 are freely movable in such a way as to enable the coils 40 to act in the manner apparent from FIG. 3 for urging the pusher means 24 toward the opening 16.

Thus, with the above construction the free end portions 36 of the springy members 32 are capable of flexing so that a relatively large number of articles can be situated one behind the other in each chamber 14, with the springy tapes 38 being capable of yielding while the pusher means 24 is further advanced into the interior of the chamber 14 up to, for example, the dot-dash line position indicated in FIG. 3. Then as each article A which is next to the opening 16 is removed from the chamber the springy tapes 38 coil upon themselves while advancing the pusher means 24 toward the opening 16 so that the series of articles are always maintained in such a position that the article which is nearest to the opening 16 is situated in engagement with the springy portions 36 of the retainer means 28.

Figure 1:
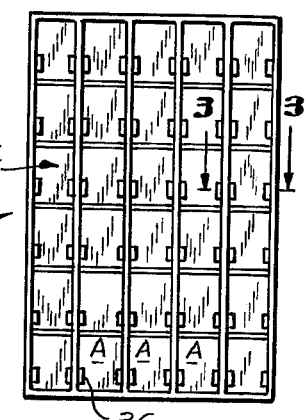
FIG. 1 is a front elevation of a device according to the invention.

Preferably, as indicated in FIG. 1, the wall means 12 defines a plurality of chambers 14 arranged in rows which are situated one next to the other. Except for the outer wall portions of the entire unit shown in FIG. 1, the intermediate walls are common to adjoining chambers. Thus, the horizontal walls 20 are common to upper and lower chambers situated on opposite sides of each wall 20, while the vertical walls 22 are common to chambers respectively situated on opposite sides of each wall 22. Moreover, the flanges 30 of the retainer means 28 are integral with each wall 22 extending therefrom in opposite directions to the chambers on opposite sides of each wall 22. This arrangement is clearly apparent from FIG. 2.

Because it is most convenient to arrange the articles A so that they rest with their bottom edges on the bottom walls 20 of the several chambers 14, the pusher 24 in each chamber also rests at its bottom edge on a wall 20, so that the springy tapes 38 can easily advance the pushers 24 while they slide along the bottom wall 20. By reason of this arrangement it will be noted that the pusher means 24 as well as the tapes 38 and the series of articles, including the springy members 32 are situated closer to the bottom wall 20 than the upper wall 20 of each chamber.

It will be seen that with a structure as described above, a relatively large number of articles can be stored in the device 10 of the invention. At the same time, these articles are arranged in such a way that a number of articles are always present directly at the open ends 16 of the several chambers to be conveniently withdrawn therefrom, whereupon the next article becomes situated at the open end of each chamber.

Of course, as soon as the last article is withdrawn from a chamber 14, the pusher means 24 will have its channels 42 directly engaging the springy free end portions 36 of the springy members 32, with the transverse channel walls 44 engaging these free end portions 36. Thus, instead of an article A being visible at the open end 16, the pusher means 24 itself will become immediately visible, so that the requirement of supplying additional articles to an empty chamber is immediately made known.

It is preferred to provide a construction according to which each chamber 14 has at least one open end 16 at the front of each chamber. The rear wall 18 is not absolutely essential. However, it is preferred to provide the structure with the rear wall 18 because in this way the structure is given greater strength and at the same time the rear wall 18 serves to limit the extent to which the pusher means 24 can be displaced away from the open end 16 of each chamber when a plurality of articles are introduced into a chamber.

What is claimed is:

1. A device for storing and displaying articles, comprising wall means defining at least one chamber which has at least one open end and which is adapted to receive in its interior a plurality of articles arranged one behind the other with one of said articles nearer to said open end of said chamber than the other articles, pusher means situated in said chamber in alignment with said open end thereof for engaging that one of the articles which is most distant from said open end of said chamber and for pushing the articles toward said open end of said chamber, spring means engaging said pusher means for urging the latter toward said open end of said chamber so that said spring means and pusher means cooperate to urge the articles out of the chamber through said open end thereof, and retainer means carried by said wall means at the region of said open end of said chamber for retaining the articles in said chamber in opposition to the force of said pusher means with the article nearest to the open end of said chamber being held by said retainer means against movement out of said chamber until the latter article is withdrawn from the chamber, whereupon said pusher means is acted upon by said spring means to advance the articles toward said open end of said chamber until the next article initially situated behind the article withdrawn from the open end of the chamber becomes situated at the location previously occupied by the withdrawn article, said wall means which defines said chamber including a pair of opposed wall portions extending longitudinally along said chamber and terminating at said open end thereof, and said retainer means including at least as a part thereof a pair of flanges fixed to said pair of opposed wall portions where they terminate at said open end of said chamber, said flanges extending inwardly toward each other from said pair of opposed wall portions to provide for said open end of said chamber between said flanges a dimension smaller than the distance between said pair of opposed wall portions, said retainer means further including only one pair of yieldable springy members respectively fixed to said opposed wall portions at inner surfaces thereof which are directed toward each other and respectively having free end portions extending inwardly toward each other from said opposed wall portions and situated adjacent but behind said flanges, said free end portions of said springy members extending inwardly beyond said flanges for directly engaging an article which is nearest to said open end of said chamber as well for being urged into engagement with said flanges so that said free end portions of said springy members together with said flanges form the retainer means which releasably retains in said chamber the row of articles with one of the latter articles situated at the region of said open end of said chamber, said flanges extending substantially along the entire length of end edges, respectively, of said opposed wall portions where they terminate at said open end of said chamber, and said flanges being relatively narrow and having a width sufficiently small to provide for a substantially full view of a front surface of an article which is nearest to said open end of said chamber, said free end portions of said springy members having a length which is only a small fraction of the length of said flanges and being situated between opposed ends of said flanges while extending inwardly beyond said flanges into overlapping relation with an article which is nearest to said open end of said chamber to an extent sufficient only for securely retaining the latter article at the open end of said chamber while still leaving substantially the entire front surface of the article nearest to the open end of said chamber uncovered and visible for displaying substantially the entire front surface of the article.

2. The combination of claim 1 and wherein said wall means defines a plurality of said chambers, with each of said chambers having in its interior said pusher means and spring means as well as said springy members.

3. The combination of claim 2 and wherein said plurality of chambers are arranged in a plurality of rows one of which is located next to the other.

4. The combination of claim 1 and wherein said free end portions of said springy members are transparent so as to render the front surface of the article nearest said open end of said chamber visible even where said free end portions of said springy members overlap the front surface of the article.

5. A device for storing and displaying articles, comprising wall means defining at least one chamber which has at least one open end and which is adapted to receive in its interior a plurality of articles arranged one behind the other with one of said articles nearer to said open end of said chamber than the other articles, pusher means situated in said chamber in alignment with said open end thereof for engaging that one of the articles which is most distant from said open end of said chamber and for pushing the articles toward said open end of said chamber, spring means engaging said pusher means for urging the latter toward said open end of said chamber so that said spring means and pusher means cooperate to urge the articles out of the chamber through said open end thereof, and retainer means carried by said wall means at the region of said open end of said chamber for retaining the articles in said chamber in opposition to the force of said pusher means with the article nearest to the open end of said chamber being held by said retainer means against movement out of said chamber until the latter article is withdrawn from the chamber, whereupon said pusher means is acted upon by said spring means to advance the articles toward said open end of said chamber until the next article initially situated behind the article withdrawn from the open end of the chamber becomes situated at the location previously occupied by the withdrawn article, said wall means which defines said chamber including a pair of opposed wall portions extending longitudinally along said chamber and terminating at said open end thereof, and said retainer means including at least as a part thereof a pair of flanges fixed to said pair of opposed wall portions where they terminate at said open end of said chamber, said flanges extending inwardly toward each other from said pair of opposed wall portions to provide for said open end of said chamber between said flanges a dimension smaller than the distance between said pair of opposed wall portions, said retainer means further including a pair of yieldable springy members respectively fixed to said opposed wall portions at inner surfaces thereof which are directed toward each other and respectively having free end portions extending inwardly toward each other from said opposed wall portions and situated adjacent but behind said flanges, said free end portions of said springy members extending inwardly beyond said flanges for directly engaging an article which is nearest to said open end of said chamber as well for being urged into engagement with said flanges so that said free end portions of said springy members together with said flanges form the retainer means which releasably retains in said chamber the row of articles with one of the latter articles situated at the region of said open end of said chamber, said spring means being integral with said pair of springy members and including a pair of elongated springy portions extending from said springy members along said inner surfaces of said opposed wall portions into engagement with said pusher means.

6. The combination of claim 5 and wherein said spring means includes a pair of elongated springy tapes integral with and extending from said springy members and having a tendency to coil upon themselves toward said springy members so that distant from the latter said tapes form coils which tend to coil up in a direction toward said open end of said chamber, and said pusher means including a pair of channels respectively receiving coiled portions of said tapes distant from said springy members and in which said tapes tend to coil upon themselves toward said springy members for urging said pusher means toward said open end of said chamber, the articles which are in said chamber being situated between said tapes.

7. The combination of claim 6 and wherein said channels are respectively situated adjacent said opposed wall portions and respectively have transverse channel walls for engaging the article most distant from said open end of said chamber at portions of the latter article adjacent said tapes while separating the coiled portions of the tapes from the article in said chamber which is most distant from said open end thereof.

8. The combination of claim 7 and wherein said pusher means has fixed to and extending between said channels a transverse wall more distant from said open end of said chamber than said transverse channel walls.

9. The combination of claim 8 and wherein said channels are respectively formed with openings situated at a greater distance from said open end of said chamber than said transverse channel walls for receiving said tapes at the portions thereof which extend into said channels where the coiled portions of said tapes are situated.

* * * * *